Dec. 24, 1968   D. C. MENGE   3,417,652
REINFORCING GUSSET PLATE
Filed Dec. 23, 1966
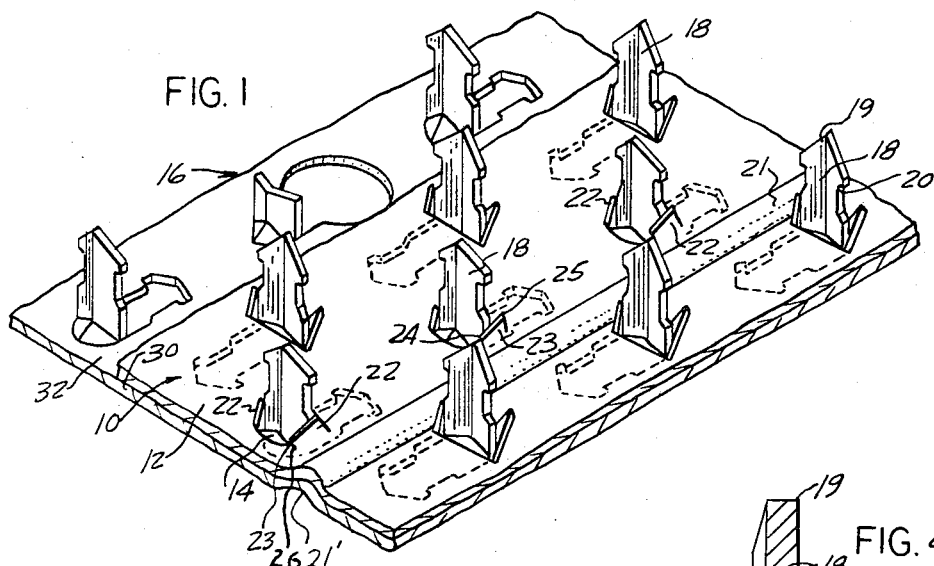
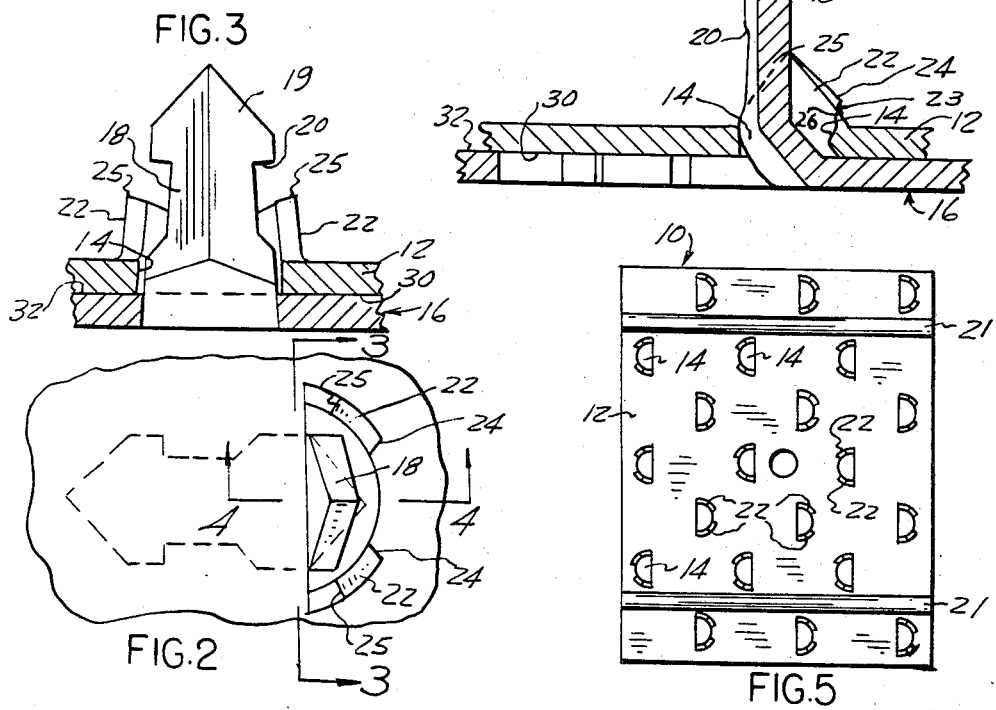
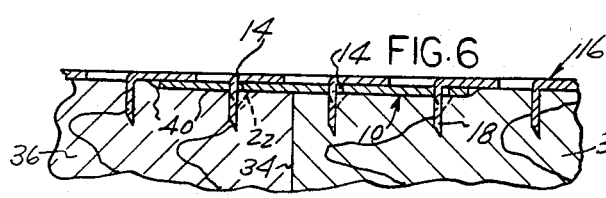
INVENTOR
DONALD C. MENGE
BY Hauke, Krass, & Gifford
ATTORNEYS

United States Patent Office 3,417,652
Patented Dec. 24, 1968

3,417,652
REINFORCING GUSSET PLATE
Donald C. Menge, Warren, Mich., assignor to Troy Steel
 Corporation, Troy, Mich., a corporation of Michigan
Filed Dec. 23, 1966, Ser. No. 604,422
2 Claims. (Cl. 85—13)

ABSTRACT OF THE DISCLOSURE

A nailing plate having a plurality of projecting teeth adapted to be pressed into wood members to form a joint of a truss structure or the like and a reinforcing gusset plate positioned intermediate the wood members and the nailing plate and having apertures for receiving the teeth so that the gusset plate reinforces the joint.

---

This invention relates to reinforcing gusset plates for metal connectors having a plurality of teeth projecting therefrom for securing together wood structural members, and more particularly to reinforcing gusset plates provided with a plurality of apertures adapted to accept the projecting teeth of a metal connector or nailing plate for the purpose of reinforcing the joints betwen wood members forming a truss structure or the like.

The reinforcing gusset plate of the present invention can be utilized in combination with any known nailing plates, such as, for example, the nailing plates disclosed in my U.S. Patent No. 3,011,226, whereby a nailing plate and a reinforcing gusset plate according to the invention can provide, in combination, a strong mechanical connection between adjoining wood members disposed within the same plane. The nailing plates used in combination with the present invention generally consists of metal plates punched out unidirectionally so as to define right-angled nails or teeth which become anchored in the material of the wood members after being driven therein by hydraulically actuated hammers or clamps. A truss structure is thus prefabricated by arranging the diverse pre-cut wood chord and web members so that they lie in a common plane, and the abutting edges or ends of the members are secured together by means of nailing plates used in combination with the reinforcing gusset plates of the present invention, such that the stress joints between the upper and lower chord members, the web and stud members are provided with enhanced structural strength without loss of assembly time and with minimum waste of material.

It is the principal object of the present invention to provide a reinforcing gusset plate utilized in combination wtih any well-known nailing plate for substantially increasing the structural strength and rigidity of the abutting joints of wood members as compared to the structural strength and rigidity resulting from the use of the nailing plate alone.

A further object of the present invention is to provide connector means for joining wood members endowed with superior strength and holding properties.

Another object of the present invention is to provide a reinforcing gusset plate adaptable to the teeth configuration of any well-known connector or nailing plate.

Yet another object of the invention is to provide a reinforcing gusset plate for a connector or nailing plate wherein the teeth of the connector or nailing plate ar not prevented from being positively anchored to the body of the joined wood members, while permitting the teeth to be driven into the members with a minimum of splitting or weakening of the wood.

Yet a further object of the invention is to provide a reinforcing plate which, when utilized in combination with a nailing plate, compresses the fibers of the wood members at the joint, thus increasing the anchoring strength between the teeth of the nailing plate and the wood of the members.

Still another object of the reinforcing gusset plate of the present invention, when utilized in combination with a nailing plate, is to add strength and durability to the joint between the diverse members with minimal breaking of the teeth of the nailing plate, bending of the plate, or splitting of the wood of the members.

Other objects and advantages of the present invention will be more readily apparent from the following detailed description of an example of a preferred embodiment thereof, when read in conjunction with the drawings in which:

FIG. 1 is a perspetcive view of a portion of an example of a reinforcing gusset plate constructed in accordance with the principles of the present invention, utilized in combination with a well-known nailing plate;

FIG. 2 is an enlarged top plan view of a portion of the arrangement shown in FIG. 1;

FIG. 3 is a partial sectional view taken substantially on the line 3—3 of FIG. 2;

FIG. 4 is a sectional view taken substantially on the line 4—4 of FIG. 2;

FIG. 5 is a top plan view of the reinforcing gusset plate of FIG. 1; and

FIG. 6 is a sectional view taken through the reinforcing gusset plate as used in combination with a nailing plate pressed into a pair of wooden members forming a joint.

Referring to the drawings now in detail, FIGS. 1–5 show a reinforcing gusset plate generally indicated at 10, made of a flat metal plate member 12, provided with a series of apertures 14 punched therefrom. The apertures 14 are punched in such a fashion that they are adapted to the teeth configuration of a connector or nailing plate 16. For example, if the nailing plate 16 has a plurality of teeth or nails 18 which are bent-over substantially at 90° angle, in a unidirectional staggered arrangement, the apertures 14 of the plate member 12, are made so as to correspond in dimension, spacing and distribtuion to the dimension, spacing and distribtuion of the teeth 18 of the nailing plate 16, each tooth 18 having a point 19 provided with a shoulder portion 20.

Consequently, the reinforcing gusset plate 10 is designed in overall size and shape, and with respect to the size, shape and positions of apertures 14, so as to correspond to the over-all size and shape of the nailing plate which is generally rectangular, although the reinforcing plate is preferably shorter so as to correspond to the size, shape and distribution of the teeth 18 of the nailing plate, such that each aperture 14 accepts a tooth 18 therethrough. Preferably, plate member 12 has elongated longitudinal fillets 21 formed therein, as best seen in FIGS. 1 and 5, longitudinally extending between adjoining rows of apertures 14, proximate two edges of the plate member, for adding rigidity to the reinforcing gusset plate, minimizing bending or flexing of the plate such as to generally provide a substantially stronger truss joint. As seen in FIG. 1, the fillets 21 in plate member 12 are disposed in such a fashion that they correspond to elongated fillets 21' in nailing plate 16.

Although it is obvious that the apertures 14 of the plate 12 may be punched with clean edges, the preferred construction is to shear and bend the plate material when each aperture is formed so as to provide a pair of teeth 22 giving added gripping points and holding power. Each tooth 22, which is bent over substantially at a right angle to the plane of plate member 12, is formed with a stem portion 23 having a lower pointed portion 24 and an upper pointed portion 25. The stem portion 23 thus defines a surface 26 which slopes inwardly and downwardly towards the plate member 12, thereby imparting edge engagement which in combination with the anchoring action in the jointed wood members of lower jointed portion 24 substantially increases the holding ability of the nailing plate 16.

In use, the reinforcing gusset plate 10 is combined with a nailing plate 16, in the manner best shown in FIGS. 1 and 6, such that the bottom surface 30 of plate member 12, engages the upper surface 32 of the nailing plate 16 with apertures 14 accepting the teeth 18 of the nailing plate. The reinforcing gusset plate teeth 22, disposed along two edges of each aperture 14, thus protrude in the same unidirectional staggered arrangement as the teeth 18 of the nailing plate 16. Although the reenforcing gusset plate 10 has generally the same width as the nailing plate 16, its length is preferably shorter, as hereinbefore mentioned, and it is positioned so as to bridge the joint 34 between, for example, two wood members being connected together, such as 36 and 38, as shown in FIG. 6.

When the reinforcing gusset plate 10 and the nailing plate 16 are used in combination and are mechanically or hydraulically pressed into wood members 36 and 38, the combined utilization of both plates gives added strength to the junction between the wood members. As shown in FIG. 6, the nailing plate 16 and the reinforcing gusset plate 10 are pressed into place upon wood members 36 and 38 across joint 34, thereby increasing the thickness of the metal of the connector means at the joint. This increased thickness augments the rigidity of the joint and the resistance to flexion stresses and bending loads of the abutted ends of the wood members.

The reinforcing gusset plate 10 is preferably made of a suitable gauge of metal varying in thickness according to purpose and application. However, 20 gauge metal plate or less may be used, which is substantially thinner than that required with conventional connector plates used alone.

In view of the presence of reinforcing gusset plate 10 sandwiched between the nailing plate 16 and the wooden members, the wood fibers disposed with their surface in engagement with the reinforcing plate are compressed so as to deform the surface, as shown at 40 in FIG. 6, with the result of improved anchoring of the teeth 18 and 22 of, respectively, the nailing plate and the reinforcing plate, into the wood of the members due to packing of the fibers against the whole surface of the teeth, and particularly below the shouldered portion 20 of teeth 18 of the nailing plate 16 and below lower pointed portion 24 of teeth 22 of reinforcing gusset plate 10.

Having thus described in detail an example of structure of a preferred embodiment of reinforcing gusset plates according to the invention, various other modifications and changes whereof will be apparent to those skilled in the art to which this invention pertains without departing from the spirit of the invention.

What is sought to be protected by United States Letters Patent is:

1. In combination with a flat nailing plate provided with a plurality of teeth struck out of the plate and unidirectionally projecting therefrom substantially normally to said plate and adapted to be driven into wood members, a reinforcing gusset plate having a plurality of apertures each of which correspond to one of said teeth, said teeth and said apertures being uniformly distributed over said plates with corresponding ones of said teeth and said apertures being located adjacent at least two of the side edges of said gusset plate, said teeth being V-shaped in cross section, said apertures having a straight edge, the ends of which are connected by a curved edge, so that upon said teeth being inserted through said apertures and into said wood members the axis of each tooth is substantially parallel to planes containing said straight edges and the lateral side edges of each tooth are substantially perpendicular thereto, the distance between the sides of the tooth and the edges of said apertures varies in a direction toward the apex of the V-shaped tooth, said gusset plate having teeth members formed in pairs along said curved edges of said apertures in said gusset plate, said teeth members being spaced from each other by said straight edge of said apertures and by a portion of said curved edge, said teeth members adapted to extend into said wood members with the spaces between said teeth members and between said teeth on said nailing plate providing an area for receiving portions of said wood members displaced by said teeth and said teeth members.

2. The combination as defined in claim 1 and in which said gusset plate has at least one linear dimension smaller than said nailing plate and is sandwiched between said nailing plate and the surface of said wood members such that when said nailing plate teeth are forced into said wood members the surface of said wood members is compressed an amount corresponding to the thickness of said reinforcing gusset teeth.

References Cited

UNITED STATES PATENTS

| 2,304,155 | 12/1942 | Dyball | 287—20.92 |
| 3,011,226 | 12/1961 | Menge | 85—13 |
| 3,212,389 | 10/1965 | Sandford | 85—13 |
| 3,241,424 | 3/1966 | Moehlenpah | 85—13 |
| 3,266,362 | 8/1966 | Carr | 85—13 |
| 3,292,481 | 12/1966 | Couch | 85—13 |

CARL W. TOMLIN, *Primary Examiner.*

R. S. BRITTS, *Assistant Examiner.*

U.S. Cl. X.R.

287—20.92